Patented Sept. 16, 1924.

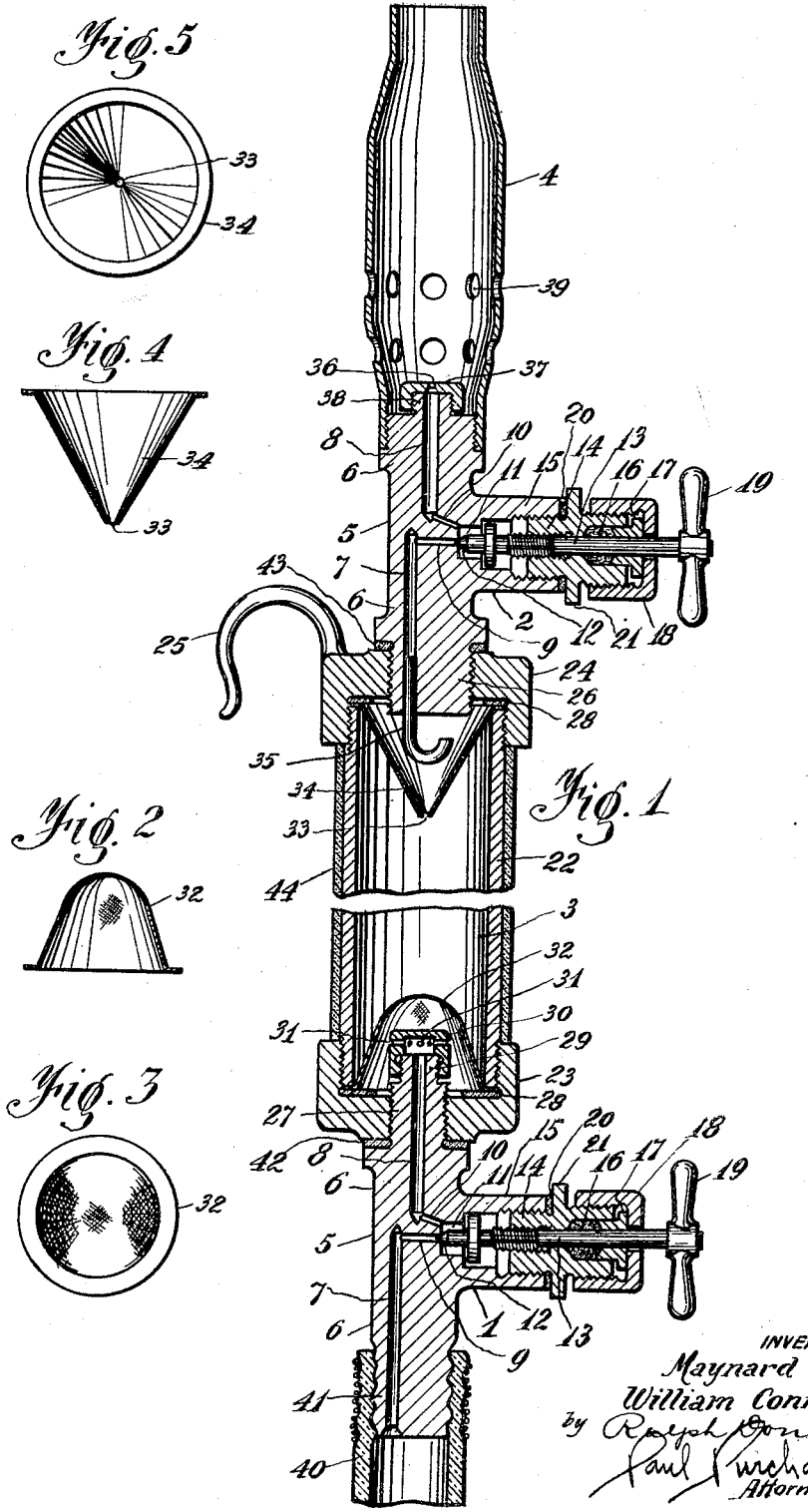

1,508,698

UNITED STATES PATENT OFFICE.

MAYNARD KELL AND WILLIAM CONNARE, OF PITTSBURGH, PENNSYLVANIA, ASSIGNORS TO PUMPLESS BLOW TORCH COMPANY, OF PITTSBURGH, PENNSYLVANIA.

BLOWTORCH.

Application filed February 15, 1923. Serial No. 619,140.

*To all whom it may concern:*

Be it known that we, MAYNARD KELL and WILLIAM CONNARE, citizens of the United States, residing at Pittsburgh, in the county of Allegheny and State of Pennsylvania, have invented certain new and useful Improvements in BlowTorches, of which the following is a specification.

This invention relates to blow torches and more in particular to torches using gasified liquid as fuel.

One of the principal objects of this invention is to provide a blow torch in which the fuel is highly atomized before reaching the burner. Another object is to provide a torch having simple and effective means for controlling and regulating the feed of the fuel. A further object is to provide a torch which is of simple construction and which can be manufactured at low cost. Further objects and advantages of the invention will appear from the specification and drawings which form a part of this application.

In the drawings is shown the application of this invention to a so-called bench burner, but it is to be understood that the same principles of construction and operation may be applied, with slight modifications, to other types of torches using the same kind of fuel.

Fig. 1 is a vertical cross-sectional view showing a complete bench burner built in accordance with this invention.

Fig. 2 is a cross-sectional view of a fuel screen used in the bench burner.

Fig. 3 is a plan view of Fig. 2.

Fig. 4 is a cross-sectional view of a conical expansion chamber used in the bench burner.

Fig. 5 is a plan view of Fig. 4.

Referring to the drawings, the bench burner is composed primarily of an inlet valve 1, an outlet valve 2, an intermediate expansion chamber 3 and a perforated flame tube 4. Valves 1 and 2 are substantially similar in design and comprise a T-shaped body 5 in the vertical legs 6 of which are drilled the holes 7 and 8, of suitable size and depth, which communicate by means of the ducts 9 and 10 respectively to the valve-chamber 11. Duct 9 may be closed by the point 12 of the valve stem 13 which is threaded in the stuffing box 14 screwed in leg 15 of the valve body 5. Any escape of fuel through the valve is prevented by the packing 16 placed within the stuffing box and compressed by the gland 17 acted upon by the screw cap 18. The valve stem is operated by means of the handle or grip 19, securely mounted thereon. A gasket 20 is preferably interposed between the collar 21 of the stuffing box and the leg 15 of the valve body to insure a leak proof valve construction.

The expansion chamber, as now designed, is made up of a metal tube 22, threaded at both ends for securing the end caps 23 and 24. The upper cap 24 is preferably provided with a hook member 25, secured thereto in any suitable manner, whereby the bench burner may be suspended when not in use. The upper and lower caps are also centrally bored and threaded to receive the threaded shanks 26 and 27, respectively, of the upper and lower valve bodies. Sealing gaskets 28 are also inserted between the said caps and tube ends to prevent any escape of gaseous fuel.

The threaded shank 27 is terminated by another threaded shank 29 upon which is screwed the fuel outlet cap 30 which is preferably closed at the top but is provided with several holes 31 disposed circumferentially thereon.

The liquefied fuel, after issuing from holes 31 is forced to pass through the fuel screen 32, made of very fine wire-gauze, thereby being broken into very small particles or globules, before entering the voluminous expansion chamber 3, where the liquefied fuel expands into a gaseous state. The entrance of the expanded fuel into the upper valve is through a small aperture 33 provided at the apex of the inverted conical expansion chamber 34 secured within and at the upper part of the main expansion chamber 3. The purpose of this conical chamber being to enable a further expansion of the gasified fuel and of the fuel globules which might not have gasified in the main chamber.

At the lower end of hole 7 is inserted the bent tube 35 in order to hinder the entrance of any particle of dirt or scale which might be present in the fuel into the upper valve. Such clogging of the valve would be more liable, were the entrance of the fuel direct. The regulated amount of gaseous fuel issues from the upper valve through the small aperture 36 drilled in cap 37, screwed on the threaded shank 38, and is there ignited within the flame tube 4, secured on the upper valve body. Apertures 39 are provided circumferentially of said tube to enable the mixture of air with the gas flame, thereby increasing the temperature of the latter.

The bench burner is connected to a fuel supply by means of a flexible hose 40 secured on the corrugated end 41 of the lower valve body. Suitable gaskets 42 and 43 are also provided to prevent leaks from the main chamber 3. The latter is also preferably supplied with an exterior sleeve 44 of heat insulating material to prevent the accumulation of condensed air humidity or frost formation outside of the tube, due to the refrigerating action of the liquid fuel expanding within the main chamber 3.

From the foregoing description of the various parts of the bench burner, its operation will be obvious to persons familiar with the art and further explanation is not considered necessary.

As stated before, many changes in the precise construction and arrangement of the various parts may be made without exceeding the scope of the claims and we reserve ourselves the liberty of making all such changes as may be thought desirable.

What we claim is:

1. In a blow torch using gasified liquid as fuel, the combination of a fuel supply; a main fuel expansion chamber positioned intermediate said fuel supply and burner; valves for regulating and controlling the entrance and exit of said fuel into and from said main expansion chamber; an additional expansion chamber formed by a partition of screening of suitable fineness located adjacent and after the fuel inlet of said main chamber; and a third expansion chamber positioned adjacent and in advance of the fuel exit of said main chamber; said third chamber being formed by a solid partition having an opening therein for the passage of the fuel; said additional chambers being positioned within the main chamber.

2. In a blow torch using gasified liquid as fuel, the combination of a fuel supply; a main fuel expansion chamber positioned intermediate said fuel supply and burner; valves for regulating and controlling the entrance and exit of said fuel into and from said main expansion chamber; an additional expansion chamber formed by a partition of screening of suitable fineness located adjacent and after the fuel inlet of said main chamber; a third expansion chamber positioned adjacent and in advance of the fuel exit of said main chamber; said third chamber being formed of a solid partition having an opening therein for the passage of the fuel; said additional chambers being positioned within the main chamber, and means to prevent the clogging by foreign matter of the valve controlling the fuel exit of said blow torch.

3. In a blow torch using gasified liquid as fuel, the combination of a fuel supply; a main fuel expansion chamber positioned intermediate said fuel supply and burner; valves for regulating and controlling the entrance and exit of said fuel into and from said main expansion chamber; an additional expansion chamber formed by a partition of screening of suitable fineness located adjacent and after the fuel inlet of said main chamber; a third expansion chamber positioned adjacent and in advance of the fuel exit of said main chamber; said third chamber being formed of a solid partition having an opening therein for the passage of the fuel; said additional chambers being positioned within the main chamber, and means to prevent the clogging by foreign matter of the valve controlling the fuel exit of said torch; said means consisting of a bent up tube inserted into the fuel duct connecting said valve with said third expansion chamber.

In testimony whereof we affix our signatures.

WILLIAM CONNARE.
MAYNARD KELL.